United States Patent
Peng et al.

(10) Patent No.: US 9,921,362 B2
(45) Date of Patent: Mar. 20, 2018

(54) BACKLIGHT SOURCE AND DISPLAY APPARATUS COMPRISING THE SAME

(71) Applicants: BOE Technology Group Co., Ltd., Beijing (CN); BOE Optical Science and Technology Co., Ltd., Suzhou (CN)

(72) Inventors: Jingdan Peng, Beijing (CN); Wenjun Li, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 321 days.

(21) Appl. No.: 14/800,845

(22) Filed: Jul. 16, 2015

(65) Prior Publication Data

US 2016/0195668 A1 Jul. 7, 2016

(30) Foreign Application Priority Data

Jan. 4, 2015 (CN) .................... 2015 2 0000639 U

(51) Int. Cl.
*F21V 8/00* (2006.01)
(52) U.S. Cl.
CPC ......... *G02B 6/0046* (2013.01); *G02B 6/0048* (2013.01); *G02B 6/0055* (2013.01); *G02B 6/0088* (2013.01)

(58) Field of Classification Search
CPC .. G02B 6/0046; G02B 6/0048; G02B 6/0055; G02B 6/0088
See application file for complete search history.

(56) References Cited

U.S. PATENT DOCUMENTS

| | | | | |
|---|---|---|---|---|
| 9,372,301 | B2 * | 6/2016 | Hsiao | G02B 6/0085 |
| 9,389,360 | B2 * | 7/2016 | Hsiao | G02B 6/0085 |
| 9,442,317 | B2 * | 9/2016 | Di | G02F 1/133308 |
| 9,644,846 | B2 * | 5/2017 | Stevenson | F23R 3/34 |
| 2016/0341885 | A1 * | 11/2016 | Xie | G02F 1/133608 |

* cited by examiner

*Primary Examiner* — Anabel Ton
(74) *Attorney, Agent, or Firm* — Westman, Champlin & Koehler, P.A.

(57) ABSTRACT

The present disclosure provides a backlight source and a display apparatus. The backlight source comprises: a light guide plate and an adhesive frame. The light guide plate comprises: a light incidence face, a light exit face connected to the light incidence face, a bottom face opposed to the light exit face, and at least one lateral faces configured to connect the light exit face to the bottom face and to be inclined with respect to the bottom face, a projection of the at least one lateral faces with respect to the bottom face falling within the bottom face. The adhesive frame is located at a periphery of the light guide plate, wherein faces of the adhesive frame which face towards the respective lateral faces are matched with the respective lateral faces.

20 Claims, 5 Drawing Sheets

BACKLIGHT SOURCE AND DISPLAY APPARATUS COMPRISING THE SAME

CROSS-REFERENCE TO RELATED APPLICATION

This application claims the benefit of Chinese Patent Application No. 201520000639.X filed on Jan. 4, 2015 in the State Intellectual Property Office of China, entitled with "backlight source and display apparatus", the whole disclosure of which is incorporated herein by reference.

BACKGROUND OF THE INVENTION

Field of the Invention

The present disclosure relates to a technical field of display, and in particular, relates to a backlight source and a display apparatus comprising the same.

Description of the Related Art

A backlight source is a light source assembly located on a backside of a display panel in a display apparatus. It is used to provide a surface light source with a uniform brightness for a display panel such that the display panel can display images normally.

At present, a conventional light source comprises: a back plate, a reflective sheet arranged on the bottom of the back plate, a light guide plate arranged on the reflective sheet, a protrusion provided on a lateral face of the light guide plate, a light source arranged on a side of the light guide plate, an optical film arranged on a light exit face of the light guide plate, an adhesive frame connected with the back plate, and a groove arranged on a face of the adhesive frame opposed to the light guide plate. The groove is engaged with the corresponding protrusion on the lateral face of the light guide plate. In use, the light emitted from the light source enters the light incidence face of the light guide plate, then exits along a plurality of paths from the light exit face of the light guide plate, and exits from the backlight source after acting with the optical film. However, in practice, besides the part of light emitted from the light exit face of the light guide plate, there is another part of the light emitted from the lateral faces from the light guide plate. As illustrated in FIG. 1, the light emitted from the lateral face 14 of the light guide plate travels towards the adhesive frame 2, is reflected by the adhesive frame 2 and then exits from a gap between the light guide plate 1 and the adhesive frame 2. It causes a bright line at an edge of the backlight source so as to degrade the display effect of the display apparatus.

SUMMARY OF THE INVENTION

Embodiments of the present invention provide a backlight source and a display apparatus comprising the same, which can improve the display effects of the display apparatus.

In accordance with one aspect of the present invention, it provides a backlight source comprising:
  a light guide plate comprising:
  a light incidence face,
  a light exit face connected to the light incidence face,
  a bottom face opposed to the light exit face, and
  at least one lateral faces configured to connect the light exit face to the bottom face and to be inclined with respect to the bottom face, a projection of the at least one lateral faces with respect to the bottom face falling within the bottom face; and
  an adhesive frame located at a periphery of the light guide plate, wherein faces of the adhesive frame which face towards the respective lateral faces are matched with the respective lateral faces.

In an example, one of the at least one lateral faces is an inclined planar face, an arc face or a wave-shaped face.

In an example, all of the at least one lateral faces are configured as any combination composed of an inclined planar face, an arc face and a wave-shaped face.

In an example, the lateral faces have an inclination angle of greater than 0° and less than 90° with respect to the bottom face when the lateral faces are planar faces.

In an example, the inclination angle of the lateral faces with respect to the bottom face is greater than or equal to 30° and less than 90°.

In an example, the backlight source further comprises a back plate in which the light guide plate is arranged, the back plate being connected to the adhesive frame.

In an example, the backlight source further comprises a bottom reflective sheet located between the light guide plate and the back plate, the bottom reflective sheet being provided with a plurality of network points.

In an example, the backlight source further comprises an optical film arranged on the light exit face of the light guide plate.

In an example, the backlight source further comprises a light shielding tape shielding a gap between the adhesive frame and the optical film.

In an example, the backlight source further comprises a light source arranged on the side of the light guide plate where the light incidence face is located.

In accordance with another aspect of the present invention, it also provides a display apparatus comprising the backlight source described as above.

In an example, one of the at least one lateral faces is an inclined planar face, an arc face or a wave-shaped face.

In an example, all of the at least one lateral faces are configured as any combination composed of an inclined planar face, an arc face and a wave-shaped face.

In an example, the inclination angle of the lateral faces with respect to the bottom face is greater than or equal to 30° and less than 90°.

In an example, the backlight source further comprises a back plate in which the light guide plate is arranged, the back plate being connected to the adhesive frame.

In an example, the backlight source further comprises:
  a bottom reflective sheet located between the light guide plate and the back plate, the bottom reflective sheet being provided with a plurality of network points; and
  an optical film arranged on the light exit face of the light guide plate.

In an example, the backlight source further comprises;
  a light shielding tape shielding a gap between the adhesive frame and the optical film; and
  a light source arranged on the side of the light guide plate where the light incidence face is located.

In the above technical solutions of the present invention, the lateral face of the light guide plate is designed as a sloping face inclined with respect to a bottom face of the light guide plate. In use, the light enters the light guide plate from its light incidence face. A part of the light is refracted by the light guide plate and emitted from the light exit face of the light guide plate; a part of the light is reflected by the bottom reflective sheet below the light guide plate and emitted from the light exit face of the light guide plate, the remainder of the light is emitted from the lateral face of the light guide plate. As the lateral faces of the light guide plate is inclined with respect to the bottom face of the light guide plate and the face of the adhesive frame facing towards the lateral face of the light guide plate is matched with the lateral face of the light guide plate, the lateral face of the light guide plate and the face of the adhesive frame facing towards the lateral face of the light guide plate changes the refractive angle of the light emitted from the lateral face of the light guide plate such that most or all of the light emitted from the lateral face of the light guide plate will not exit from the gap between the light guide plate and the adhesive frame. In this way, the intensity of the bright lines present on an edge of the backlight source may be reduced or the bright lines at the edge of the backlight source may be avoided, so as to improve the display effects of the display apparatus.

BRIEF DESCRIPTION OF THE DRAWINGS

The accompanied drawings herein are used to further illustrate the present disclosure and form part of the present disclosure. Exemplary embodiments of the present invention and the description thereof are intended to explain the present invention only, instead of limiting the present invention. In the drawings.

Figure 1:
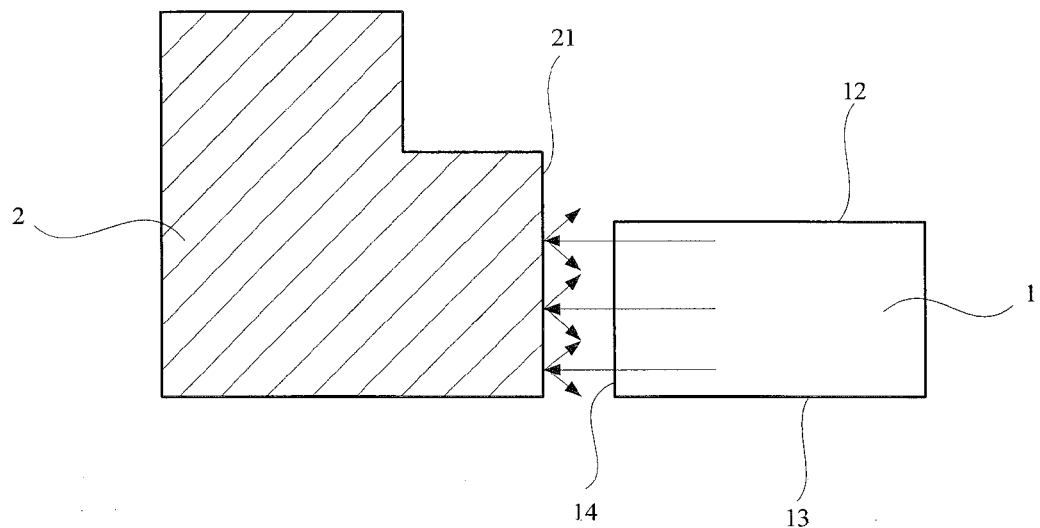
FIG. 1 is a partial schematic view of a backlight source in the prior art.

| Reference Numerals | | |
|---|---|---|
| 1: light guide plate | 11: light incidence face | 12: light exit face |
| 13: bottom face | 14, 15, 16: lateral faces | 2: adhesive frame |
| 21: sloping face | 3: back plate | 4: bottom reflective sheet |
| 5: optical film | 6: light shielding tape | |

DETAILED DESCRIPTION OF PREFERRED EMBODIMENTS OF THE INVENTION

Exemplary embodiments of the present disclosure will be described below in detail with reference to drawings, so as to further explain the backlight source and the display apparatus provided by the embodiments.

First Embodiment

Figure 2:
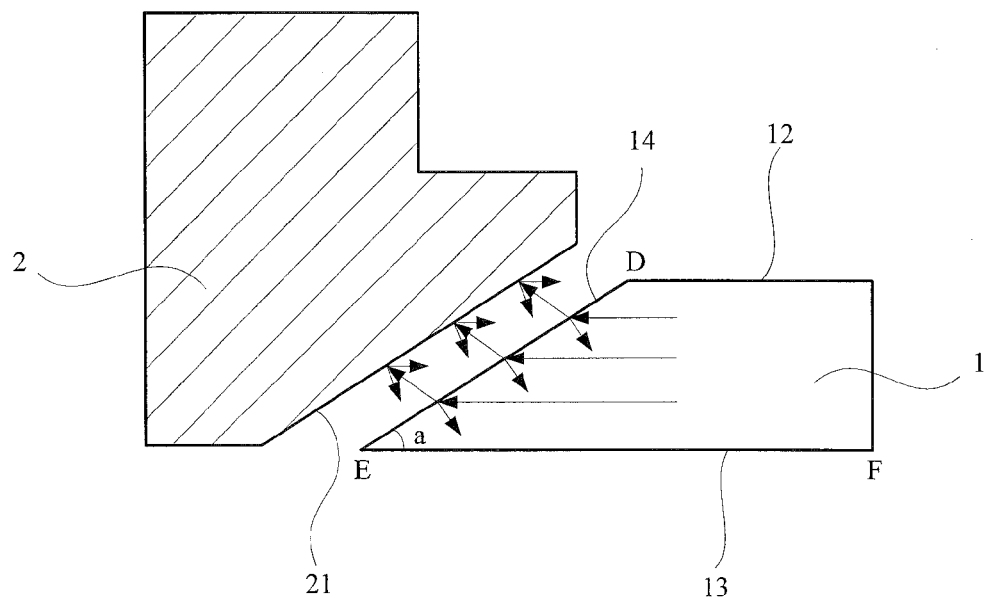
FIG. 2 is a partial schematic view of the backlight source according to an embodiment of the present invention, wherein the lateral face of the light guide plate is a planar face.
Figure 3:
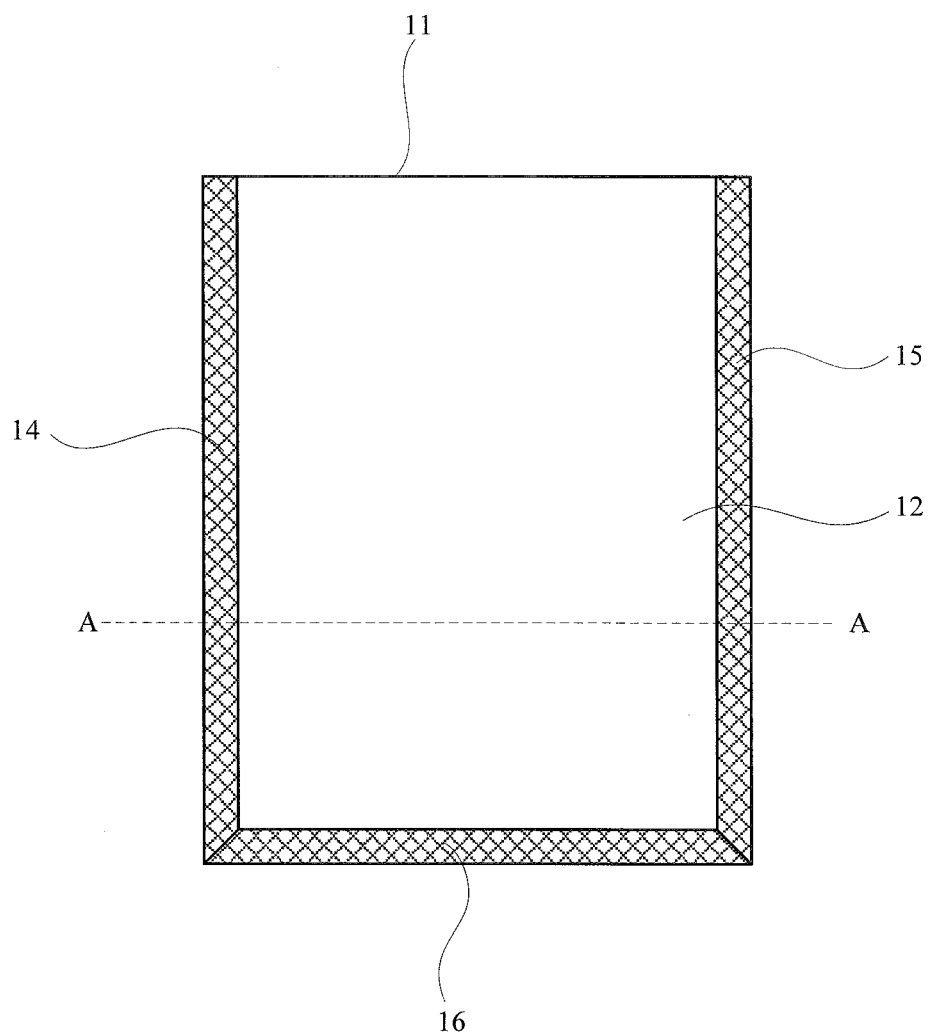
FIG. 3 is a top view of a light guide plate according to an embodiment of the present invention.
Figure 4:
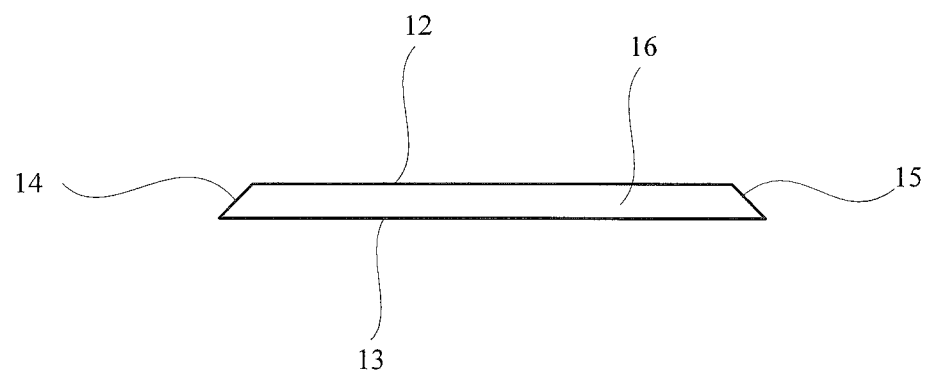
FIG. 4 is a cross sectional view of the light guide plate taken along A-A direction in FIG. 3.

With reference to FIGS. 2-4, an embodiment of the present invention provides a backlight source including a light guide plate 1 and an adhesive frame 2. The light guide plate 1 includes: a light incidence face 11, a light exit face 12, a bottom face 13 and at least one lateral faces. The light exit face 12 is connected to the light incidence face 11. The bottom face 13 is opposed to the light exit face 12. The lateral faces are inclined with respect to the bottom face 13. And a projection of the at least one lateral faces with respect to the bottom face 13 falls within the bottom face 13. The adhesive frame 2 is located at a periphery of the light guide plate 1. And faces of the adhesive frame 2 which face towards the respective lateral faces are matched with the respective lateral faces.

In an example, as illustrated in FIG. 2, the lateral face 14 is inclined towards a central region of the light exit face 12, and the angle between the lateral face 14 and the bottom face 13 is an acute angle. The face of the adhesive frame 2 facing the lateral face 14 is a sloping face 21. The sloping face 21 has the same inclination direction and the same inclination angle as the lateral face 14. As the lateral face 14 and the sloping face 21 are inclined with respect to the bottom face 13, most or all of the light emitted from the lateral faces 14 of the light guide plate 1 cannot be emitted from the gap between the light guide plate 1 and the adhesive frame 2, such that the intensity of bright lines presented at an edge of the backlight source may be reduced or the bright lines presented at the edge of the backlight source may be avoided, so as to improve the display effects of the display apparatus. In addition, as the lateral face 14 and the sloping face 21 are both inclined with respect to the bottom face and have the same inclination direction and the same inclination angle, the sloping face 21 also limits the movement of the light guide plate 1 with respect to the adhesive frame 2. In this way, the lateral face of the light guide plate 1 does not need to be provided with any protrusions configured to limit the movement of the light guide plate 1 with respect to the adhesive frame 2, so as to prevent bright spots from being produced on the backlight source due to concentration of the light at the protrusion, and finally to further improve the display effects of the display apparatus.

It should be noted that any one or more of the lateral faces 14-16 may be inclined with respect to the bottom face 13. As illustrated in FIG. 3, all of the lateral faces 14-16 are inclined with respect to the bottom face 13. The face of the adhesive frame 2 facing towards the lateral face 14 and the lateral face 14 have the same inclination direction and the same inclination angle. The face of the adhesive frame 2 facing towards the lateral face 15 and the lateral face 15 have the same inclination direction and the same inclination angle. The face of the adhesive frame 2 facing towards the lateral face 16 and the lateral face 16 have the same inclination direction and the same inclination angle. When the light is directed to the adhesive frame 2 from the lateral faces 14-16, the face of the adhesive frame 2 facing towards the lateral face 14, the face of the adhesive frame 2 facing towards the lateral face 15, and the face of the adhesive frame 2 facing towards the lateral face 16 reflect the light into the light guide plate 1 respectively such that the light emitted from the gap between the lateral face 14 and the adhesive frame 2, the light emitted from the gap between the lateral face 15 and the adhesive frame 2 and the light emitted from the gap between the lateral face 16 and the adhesive frame 2 can be reduced. In this way, the intensity of the bright line presented at the edge of the backlight source may be reduced to improve the display effects of the display apparatus.

Referring to FIG. 2 again, the lateral face 14 is an inclined planar face. The angle between the edge DE of the lateral face 14 and the edge EF of the bottom face 13 is an inclination angle a, which is greater than 0° and less than 90°. The specific value of the inclination angle a may be provided as required. In order to achieve better reflective effects that more light irradiated on the adhesive frame 2 are be reflected back to the light guide plate 1, preferably, the inclination angle a is greater than or equal to 30° and less than 90°.

In an embodiment, one, two or all of the lateral faces 14, 15, 16 may be planar faces inclined with respect to the bottom face 13.

Figure 5:
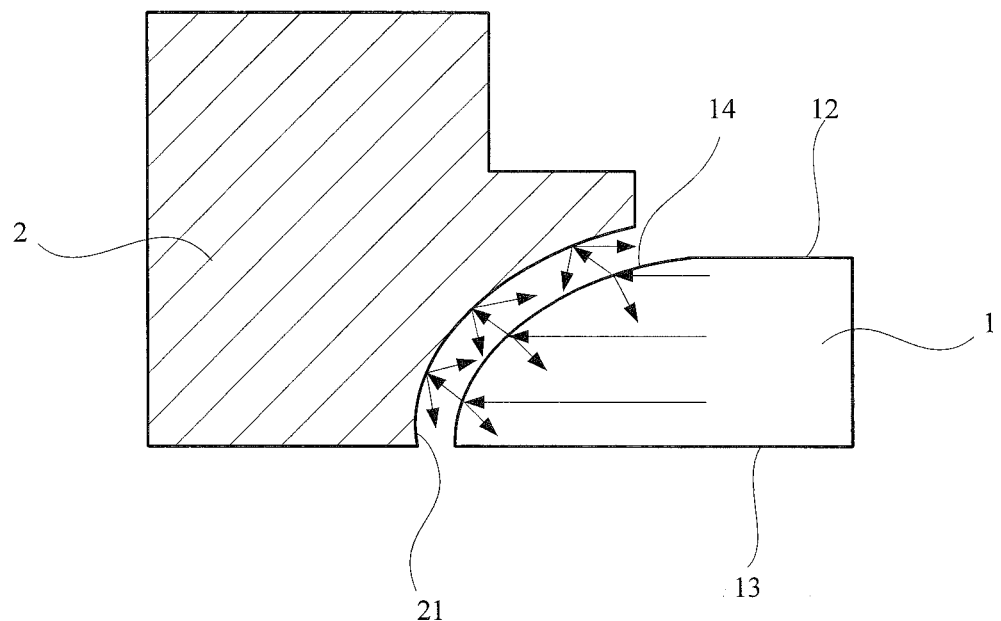
FIG. 5 is a partial schematic view of the backlight source according to an embodiment of the present invention, wherein the lateral face of the light guide plate is an arc face.

In the above embodiment, the lateral face 14 is a planar face. But, it is not limited to this, for example, the lateral face 14 may be an arc face or a wave-shaped face. As shown in FIG. 5, when seeing along a direction perpendicular to the page sheet, the lateral face 14 may be an arc-shaped structure projecting towards the sloping face 21 and the sloping face 21 facing towards the lateral face 14 is a recess arc-shaped structure and vice versa. That is, the lateral face 14 is a recess arc-shaped structure facing towards the sloping face 21 while the sloping face 21 facing towards the lateral face 14 is an arc-shaped structure projecting outwardly.

Figure 6:
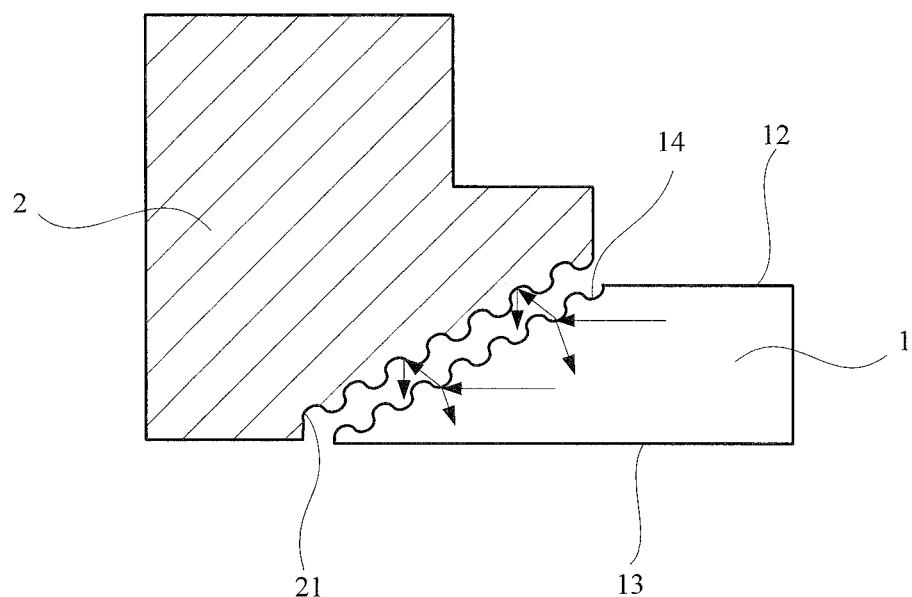
FIG. 6 is a partial schematic view of the backlight source according to an embodiment of the present invention, wherein the lateral face of the light guide plate is a wave-shaped face.

As shown in FIG. 6, when seeing along a direction perpendicular to the page sheet, the lateral face 14 is a wave-shaped structure and the sloping face 21 facing towards the lateral face 14 has a shape matched with the shape of the lateral face 14, i.e., it is also wave-shaped. The lateral face 14 with the wave-shaped structure and the sloping face 21 with the wave-shaped structure may enable to have more refractive angles of the light such that the light emitted from the gap between the light guide plate 1 and the adhesive frame 2 becomes less, so as to enhance the display effects of the display apparatus.

It should be understood that one, two or all of the lateral faces 14, 15, 16 may be arranged as arc-shaped faces or wave-shaped faces. Alternatively, as an example, the lateral faces 14, 15, 16 may also be configured as any combination composed of an inclined planar face, an arc face and a wave-shaped face.

In order to make the light in the light guide plate emitted from the backlight source more uniformly, the bottom face 13 is typically provided with a plurality of network points arranged in an array. The light traveling towards the bottom face 13 exits from the light exit face 12 uniformly after it has been reflected by the plurality of network points on the bottom face 13 such that the light emitted from the backlight source becomes more uniform.

Figure 7:
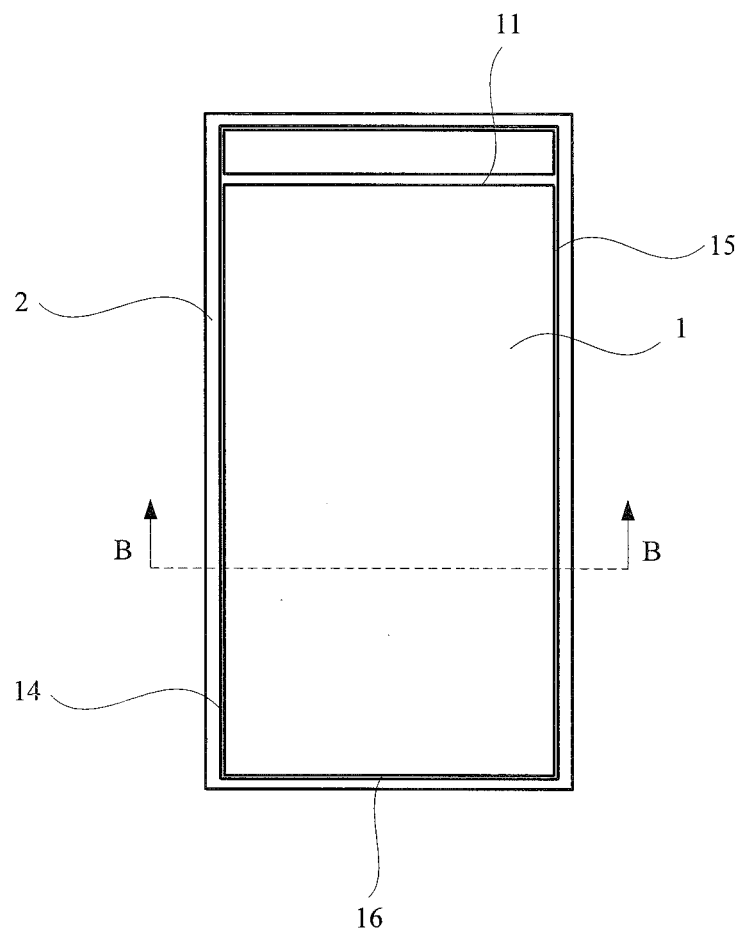
FIG. 7 is a top view of a light guide plate according to an embodiment of the present invention.
Figure 8:
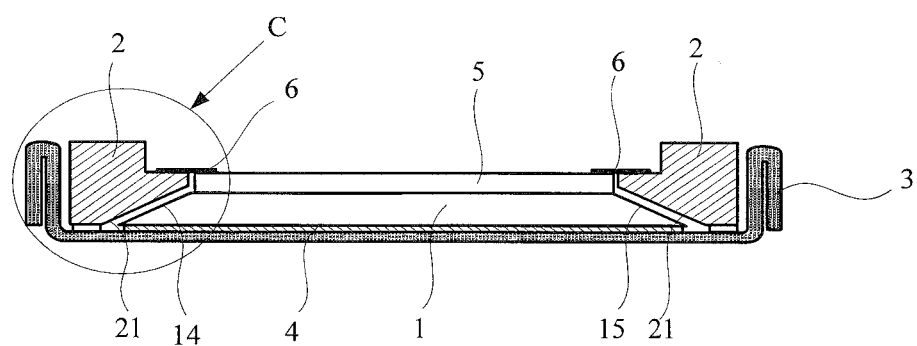
FIG. 8 is a cross sectional view of the light guide plate taken along B-B direction in FIG. 7.
Figure 9:
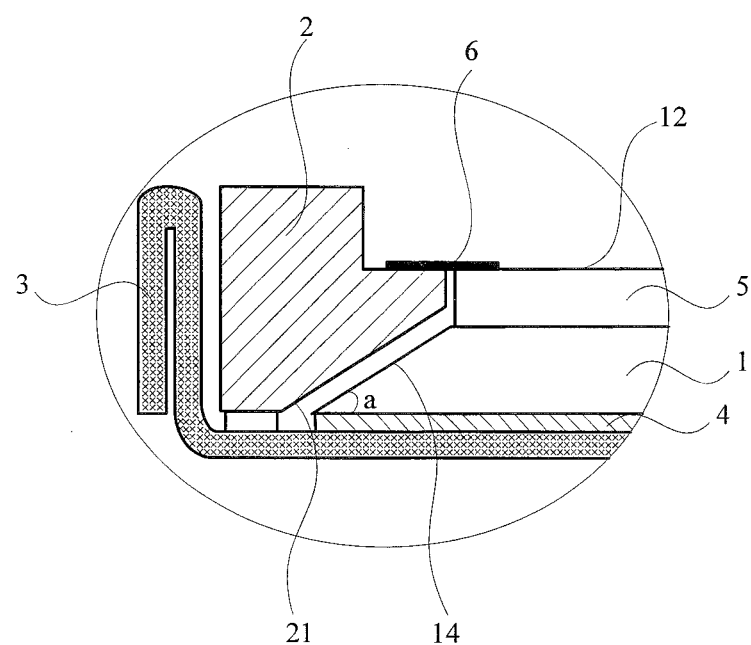
FIG. 9 is an enlarged view of the region C shown in FIG. 8.

As illustrated in FIGS. 7, 8, and 9, the backlight source in the above embodiment typically further includes a back plate 3, a bottom reflective sheet 4, an optical film 5 and a light shielding tape 6. The back plate 3 is connected to the adhesive frame 2. The light guide plate 1 is arranged in the back plate 3. The bottom reflective sheet 4 is located between the light guide plate 1 and the back plate 3. The optical film 5 is arranged on the light exit face 12 of the light guide plate 1. The light shielding tape 6 shields a gap between the adhesive frame 2 and the optical film 5. The light enters the light guide plate 1 from the light incidence face 11. A part of the light is refracted by the light guide plate 1 and emitted from the light exit face 12; a part of the light is reflected by the bottom reflective sheet 4 and emitted from the light exit face 12, the remainder of the light is emitted from the lateral face of the light guide plate 1. The light emitted from the lateral face 14 is directed towards the sloping face 21. The sloping face 21 reflects most of the light into the light guide plate 1; and the remainder of the light passes through the gap between the light guide plate 1 and the adhesive frame 2 and travels towards the light shielding tape 6. The light shielding tape 6 prevents the light from being emitted from the backlight source through the gap between the light guide plate 1 and the adhesive frame 2, so as to avoid the bright lines present on the edge of the backlight source to improve the display effects of the display apparatus significantly.

It should be noted that, as the sloping face 21 reflects most of the light into the light guide plate 1, the light emitted from the gap between the light guide plate 1 and the adhesive frame 2 to the light shielding tape 6 becomes less. Thus, the light shielding tape 6 having a low width may be used in the backlight source to increase the visual region of the backlight, so as to further improve the display effects of the display apparatus.

Second Embodiment

The second embodiment of the present invention provides a display apparatus comprising the backlight source as described in the first embodiment. In the display apparatus, the backlight source as described in the first embodiment is used; thus, the intensity of the bright lines at the edge of the backlight source may be reduced significantly, even to avoid the bright lines present at the edge of the backlight source, so as to improve the display effects of the display apparatus.

It should be noted that the display apparatus may be any products or components having display function, such as a liquid crystal display panel, an electronic paper, a cell phone, a tablet computer, a liquid crystal TV, a liquid crystal display, a notebook computer, a digital camera frame or a navigator.

In the above description for embodiments, the specific features, structures, materials or characteristics may be combined in suitable manner in any one or more of embodiments or examples.

Although several exemplary embodiments have been shown and described, the present invention is not limited to those and it would be appreciated by those skilled in the art that various changes or modifications may be made in these embodiments without departing from the principles and spirit of the disclosure. These changes or modifications will fall within the scope of the present invention. The scope of the present invention is defined by the appended claims and their equivalents.

What is claimed is:

1. A backlight source comprising:
 a light guide plate comprising:
  a light incidence face,
  a light exit face connected to the light incidence face,
  a bottom face opposed to the light exit face, and
  four lateral faces configured to connect the light exit face to the bottom face, wherein one of the four lateral faces is provided the light incidence face and an entire face of each lateral face among the other three lateral faces is designed to be inclined with respect to the bottom face, a projection of the at least one lateral faces with respect to the bottom face falling within the bottom face; and
 an adhesive frame located at a periphery of the light guide plate,
 wherein faces of the frame which face towards the respective lateral faces are matched with the respective lateral faces.

2. The backlight source according to claim 1, wherein one of the at least one lateral faces is an inclined planar face, an arc face or a wave-shaped face.

3. The backlight source according to claim 1, wherein all of the at least one lateral faces are configured as any combination composed of an inclined planar face, an arc face and a wave-shaped face.

4. The backlight source according to claim 2, wherein the lateral faces have an inclination angle of greater than 0° and less than 90° with respect to the bottom face when the lateral faces are planar faces.

5. The backlight source according to claim 4, wherein the inclination angle of the lateral faces with respect to the bottom face is greater than or equal to 30° and less than 90°.

6. The backlight source according to claim 3, wherein the lateral faces have an inclination angle of greater than 0° and less than 90° with respect to the bottom face when the lateral faces are planar faces.

7. The backlight source according to claim 6, wherein the inclination angle of the lateral faces with respect to the bottom face is greater than or equal to 30° and less than 90°.

8. The backlight source according to claim 1, further comprising a back plate in which the light guide plate is arranged, the back plate being connected to the frame.

9. The backlight source according to claim 1, further comprising a bottom reflective sheet located between the light guide plate and the back plate, the bottom reflective sheet being provided with a plurality of network points.

10. The backlight source according to claim 1, further comprising an optical film arranged on the light exit face of the light guide plate.

11. The backlight source according to claim 1, further comprising a light shielding tape shielding a gap between the frame and the optical film.

12. The backlight source according to claim 1, further comprising a light source arranged on the side of the light guide plate where the light incidence face is located.

13. A display apparatus comprising the backlight source according to claim 1.

14. The display apparatus according to claim 13, wherein one of the at least one lateral faces is an inclined planar face, an arc face or a wave-shaped face.

15. The display apparatus according to claim 13, wherein all of the at least one lateral faces are configured as any combination composed of an inclined planar face, an arc face and a wave-shaped face.

16. The display apparatus according to claim 14, wherein the inclination angle of the lateral faces with respect to the bottom face is greater than or equal to 30° and less than 90°.

17. The display apparatus according to claim 15, wherein the inclination angle of the lateral faces with respect to the bottom face is greater than or equal to 30° and less than 90°.

18. The display apparatus according to claim 13, wherein the backlight source further comprises a back plate in which the light guide plate is arranged, the back plate being connected to the frame.

19. The display apparatus according to claim 13, wherein the backlight source further comprises:
 a bottom reflective sheet located between the light guide plate and the back plate, the bottom reflective sheet being provided with a plurality of network points; and
 an optical film arranged on the light exit face of the light guide plate.

20. The display apparatus according to claim 13, wherein the backlight source further comprises:
 a light shielding tape shielding a gap between the frame and the optical film; and
 a light source arranged on the side of the light guide plate where the light incidence face is located.

* * * * *